Aug. 14, 1962  E. A. LAURILA  3,049,234
MAGNETIC DRUM SEPARATOR
Filed Feb. 9, 1960  2 Sheets-Sheet 2

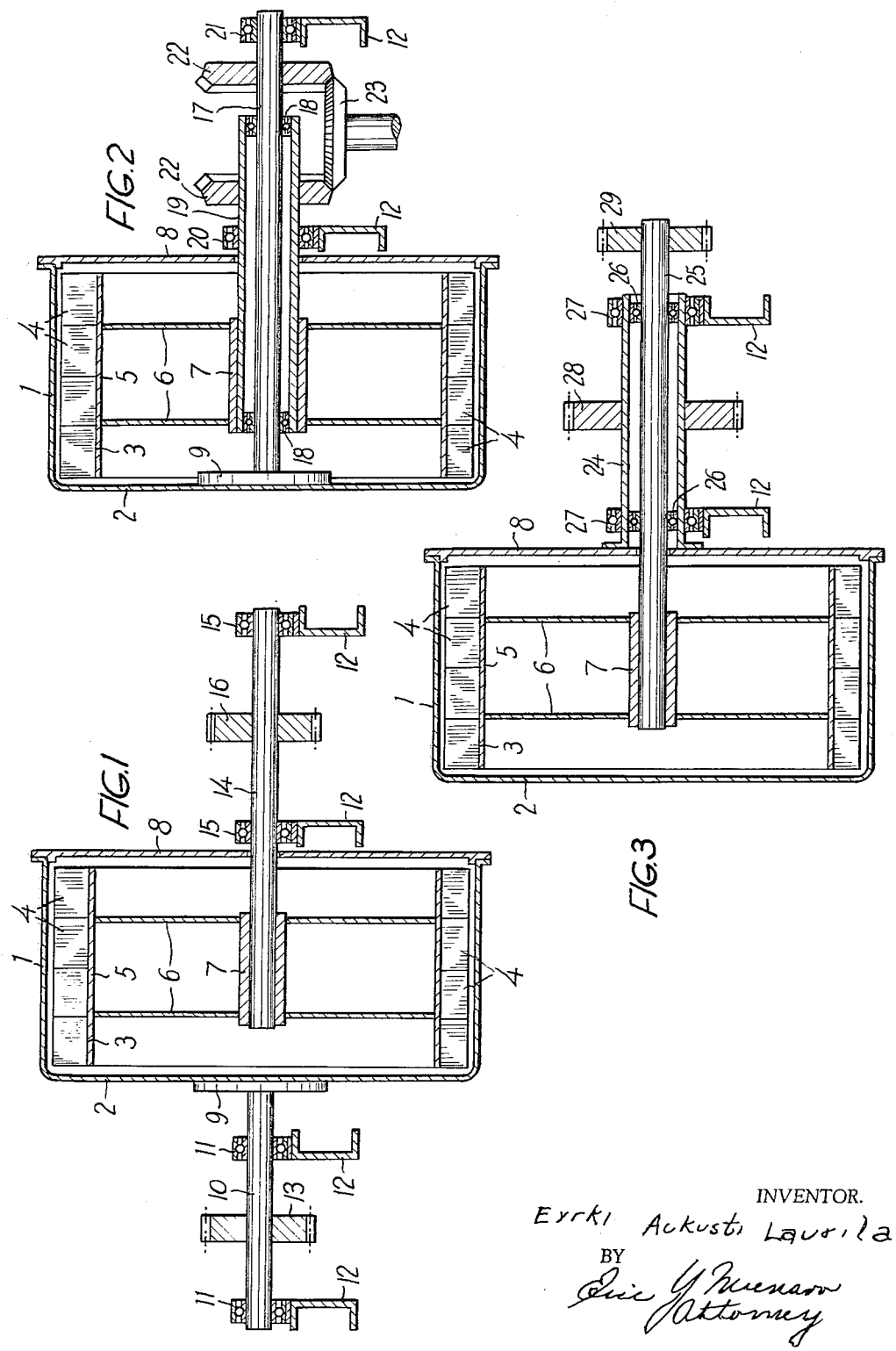

INVENTOR.
Eerki Aukusti Laurila
BY

United States Patent Office 3,049,234
Patented Aug. 14, 1962

3,049,234
MAGNETIC DRUM SEPARATOR
Errki Aukusti Laurila, Helsinki, Finland, assignor to Sala Maskinfabriks Aktiebolag, Sala, Sweden, a corporation of Sweden
Filed Feb. 9, 1960, Ser. No. 7,670
Claims priority, application Germany Feb. 11, 1959
8 Claims. (Cl. 209—219)

The present invention relates to magnetic drum separators for separating magnetic and non-magnetic granular materials from a mixture of such materials while in a dry state. More particularly, the invention relates to the separation of the gangue from ores by the use of a magnetic separator.

In magnetic drum separators having a rotatable separator drum and a therein-arranged magnet system, it is known to arrange the separator drum and the magnet system so that they rotate independently of one another. In such magnetic separators, the separator drum during operation, is subjected to very substantial wear or friction from contact with the material being separated. This necessitates relatively frequent replacement of the separator drum. In known magnetic separators of the type in question, the replacement of the separator drums is relatively difficult because of the fact that the large number of bearings for the separator drum and for the magnet must be dismantled or disassembled.

It is therefore an object of the present invention to eliminate these disadvantages, i.e., to provide means by which the removal and replacement of the separator drum will be materially facilitated. In a drum separator provided with a rotatable separator drum and with a rotatable magnet system arranged within the same, where the separator drum and the magnet system rotate independently of one another during operation, the present invention is characterized by the fact that the separator drum and the magnet system are independently journalled on a free supporting axle. This construction of the magnetic separator makes it possible to permit the separate removal of the separator drum, or possibly even the separate removal of the magnet system without having to exchange or disassemble the bearings for the rotatable parts.

A special advantage of the invention follows from the fact that one end of the separator drum is closed by means of a wall which, together with the separator drum is formed as a single piece that can be produced by extrusion or drawing processes. By virtue of this construction, the manufacture of the drum separator is simplified; is rendered more economical; the various parts of the apparatus are reduced in number and the assembling steps are materially decreased.

The invention further contemplates such a construction of a magnetic separator that the bearings for the two rotatable parts thereof are located on the same side of the wall which closes one end of the drum, whereby one of these rotatable parts is arranged on a hollow axle and the other on a second axle, with the latter axle extending axially and concentrically through the hollow axle. Because of this arrangement, there is secured a decidedly compact construction for the entire magnetic separator and the possibility of replacing the separator drum independently and unitarily without having to remove or disassemble any bearings. For the mounting of one of the rotatable parts on the hollow axle, and the mounting of the second rotatable part on the inner axle or that which extends through the hollow axle, the invention provides special possibilities; either the hollow axle can support the magnet system and the inner axle can be connected to the wall which closes one end of the drum, or the inner axle can support the magnet system and the separator drum can be connected to a preferably closed, ring-disk mounted on the hollow axle on its end that faces away from the drum-closing wall. In order to make it possible to arrange a bearing for the hollow axle as near to the center of the separator drum as possible, and so that the forces may be utilized in the most advantageous manner, it is desirable to form the ring disk so that it is cupped in a direction toward the wall of the drum. For the journalling of the hollow axle and the inner axle, the invention contemplates several arrangements. Especially may be mentioned the fact that either the hollow axle may be journalled at two points in the separator frame and the inner axle at two points within the hollow axle, or the inner axle may be journalled at only one point in the hollow axle and at one point in the separator frame. In order to utilize the forces in the most advantageous manner, it is preferable that the bearings by means of which the inner axle is journalled in the hollow axle are arranged as near to the ends of the hollow axle as possible. Furthermore, it is also desirable, in order to reduce the load on the hollow axle, and thus simplify the steps for assembly during the manufacturing process, that each bearing in which the hollow axle is journalled in the separator frame and the one bearing in which the inner axle is journalled in the hollow axle, shall be arranged in the same plane.

With these and other objects to be hereinafter set forth in view, I have devised the arrangement of parts to be described and more particularly pointed out in the claims appended hereto.

In the accompanying drawings, wherein several embodiments of the invention are disclosed, FIG. 1 is a vertical sectional view of a magnetic drum separator constructed according to the present invention;

FIG. 2 is a similar sectional view of another embodiment of the invention;

FIG. 3 is a similar sectional view of a third embodiment of the invention;

Figure 4:
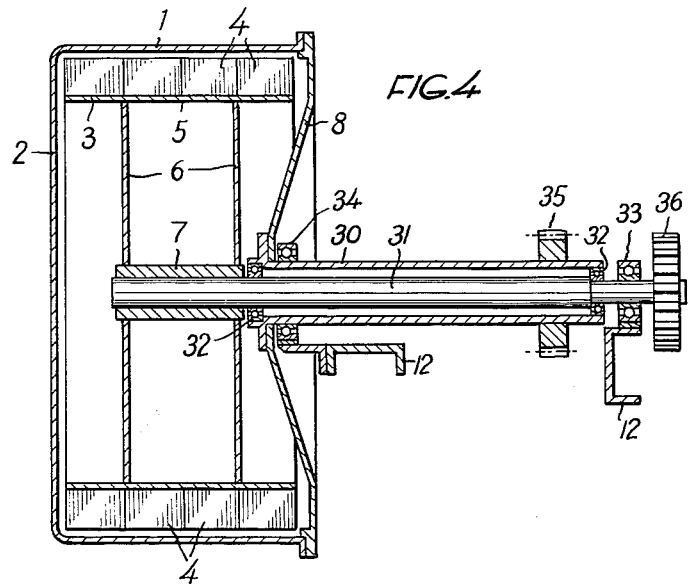
FIG. 4 is a similar sectional view of a fourth embodiment of the invention.

The drum separator, as constructed according to the present invention, is particularly adapted to constructions wherein the drum is of large diameter and of relatively short axial length. Such drum separators are especially suitable where the separation process requires a relatively high speed between the separator drum and the magnet system and in which case the two rotatable parts are rotative in opposite directions.

The rotatable separator drum 1 is preferably integrally formed with an end wall 2, which closes one end of the drum, and the construction of the drum is such that it may be readily made by known extrusion or drawing methods. At its end opposite to the wall 2, the drum is closed by a disk or closure plate 8 which may be circumferentially attached to the peripheral wall of the drum in such a manner as to permit the ready removal of the disk or closure plate when required.

Located within the drum 1 is a rotatable magnet system or arrangement generally indicated at 3 and which includes the magnets 4 mounted on a rotary support that includes a circumferential or cylindrical wall 5 and disks 6 within it, the disks extending between the wall 5 and a sleeve-shaped hub 7.

In the embodiment shown in FIG. 1, the drum 1 is mounted on an axle 10 by means of a flange 9 suitably attached to the outer face of the end wall 2 of the drum. The axle 10 is rotatably supported in a pair of bearings 11 provided in the separator frame, portions of which are shown at 12. A gear 13 is fixed on the axle 10.

The magnet system or arrangement has its hub 7 secured on a shaft 14, constituting an axle for the magnet system, said axle being journalled in the separator frame elements 12 by means of the bearings 15. A gear 16 is secured on the axle 14. By means of suitable gearing, engaging the gears shown respectively at 13 and 16, and which gearing can be driven from a single motor, both of the axles 10 and 14 may be rotated in opposite directions and at the required different speeds.

In the embodiment of the invention shown in FIG. 2, the separator drum 1 is mounted in an axle 17 by means of a flange 9 secured to the inner face of the wall 2 of the drum. The axle 17 constitutes an inner axle since it extends axially and concentrically through an outer hollow axle 19 which supports the magnet system. The two axles thus constitute shafts for the drum and magnet system or magnet carrier. The magnet carrier has its hub 7 mounted on the hollow axle. The inner axle 17 is journalled in the hollow axle 19 by means of the bearings 18 situated at the opposite ends of the hollow axle. The hollow axle 19 is in turn journalled in the separator frame element 12 by means of the bearing 20 while the inner axle 17 is similarly journalled in the separator frame element by means of the bearing 21. On each of the axles 17 and 19 is a bevel gear 22, both of the bevel gears 22 being in mesh with a bevel gear 23 suitably driven from a motor. The gearing arrangement is such that the two axles 17 and 19 will be driven in opposite directions. All of the bearings for both of the axles are in axial alignment.

In the embodiment of the invention shown in FIG. 3, the separator drum 1 is mounted on a hollow axle 24 by means of a radial flange provided on one end of said axle and which is fastened to the closure disk 8. An inner axle 25 extends co-axially through the holow axle 24 and has an end part projecting into the drum 1, and the hub 7 of the magnet carrier 3 is secured on said end part of the inner axle. The inner axle 25 is rotative in bearings 26 provided within the hollow shaft 24 adjacent to its opposite ends. The hollow axle 24 is rotative in the bearings 27 mounted in the separator frame elements 12. Secured on the hollow axle 24 is a gear 28, and a gear 29 is secured on an extended end of the inner axle, the two gears 28 and 29 being suitably driven by gearing from a motor.

Figure 5:
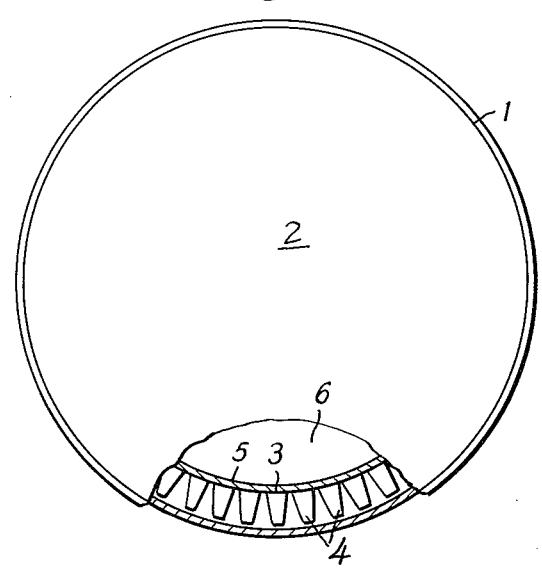
FIG. 5 is an end elevation of the structure shown in FIG. 4, as viewed from the left of FIG. 4.

In the embodiment of the invention shown in FIGS. 4 and 5, the separator drum 1 is mounted on a hollow axle 30 by means of a radial flange provided at one of its ends and by which it is fastened in any suitable way to the closure plate or disk 8. In this embodiment, the closure plate or disk 8 is dished inwardly toward the wall 2 of the drum 1. An axle 31, constituting an inner axle, extends through the hollow axle 30. The inner axle 31 is journalled in the hollow axle 30 by means of the bearings 32 located within and at the opposite ends of the hollow axle. The inner axle 31 also has one end rotative in the bearing 33, while the hollow axle 30 is rotative in the single bearing shown at 34 supported by the frame element 12. Bearing 33 is also supported by one of the frame elements 12. A gear 35 is carried by the hollow axle 30 and a gear 36 is carried by the projecting end of the inner axle 31, both of these gears being suitably driven from a motor.

The structural arrangement of the several embodiments are such that the drum and magnet systems may be readily removed when required without disturbance of the several bearings in which these parts are rotative.

Having described several embodiments of the invention, it is obvious that the same is not to be restricted thereto, but is broad enough to cover all structures coming within the scope of the annexed claims.

What is claimed is:

1. A magnetic drum separator having a rotatable drum provided with end walls, a rotatable magnet carrier located within the drum, one of said rotatable members being mounted on a hollow axle, the second rotatable member being mounted on an inner axle located within the hollow axle, and gearing for driving both of the axles, said inner axle being secured to one end wall only of the drum.

2. A magnetic drum separator comprising, a frame, a hollow axle, a magnet carrier mounted on said axle, an inner axle located within and co-axial with the hollow axle, a drum located around and enclosing the magnet carrier, the drum having end walls to only one of which one end of the inner axle is fixedly secured, bearings located within the hollow axle adjacent to the opposite ends of the same and within which the inner axle is rotative, a bearing in the frame and in which the hollow axle is rotative, gears carried respectively by the hollow axle and the inner axle, and a gear engaging both of said gears in a manner to rotate the same in opposite directions.

3. A magnetic drum separator comprising, a hollow drum having spaced end walls, one of said end walls being removable and the other end wall having an integrally-formed peripheral wall, a magnet carrier rotative within the drum, a shaft projecting through the removable wall and terminating short of the opposite end wall and having an end portion positioned within the drum, the magnet carrier having a hub mounted on said end portion of the shaft, a frame having elements in which bearings are positioned, the shaft being rotative in the bearings externally of the drum, a second shaft having an end secured to the second end wall only of the drum, bearings in the frame in which the second shaft is rotative, and a gear on each of the shafts for causing rotative movement of said shafts.

4. A magnetic drum separator comprising, a frame, a hollow drum having a side wall and an integrally-formed peripheral wall a magnet carrier rotative within the drum, a closure plate for one end of the drum, a hollow axle secured at one end to said plate, an inner axle extending axially through the hollow axle and having an end portion projecting into the drum and terminating at a distance from the end wall thereof, the magnet carrier having a hub secured on said end portion of the inner axle, the inner axle having a projecting portion at its opposite end extending beyond the adjacent end of the hollow axle, a bearing in the frame in which the latter projecting portion of the inner axle is rotative, bearings within the hollow axle in which the inner axle is rotative, a second bearing in the frame in which the hollow axle is rotative, and transmission means for causing rotative movement of both axles.

5. A magnetic drum separator comprising, a frame, a rotative hollow drum having end walls, one of said end walls being removable, the second end wall having an integrally-formed peripheral wall, a hollow axle extending through the removable end wall and having a portion located within the drum and terminating short of the second end wall, a magnet carrier located within the drum and mounted on said portion of the hollow axle, a bearing mounted in the frame externally of the drum and in which the hollow axle is rotative, an inner axle extending axially through the hollow axle and having an end located within the drum and extending beyond an end of the hollow axle, the end of the inner axle being secured to the second end wall only of the drum, said inner axle having a second end projecting out of the hollow axle, a bearing in the frame in which said second end of the inner axle is rotative, bearings within the hollow axle in which the inner axle is rotative, and gears on the hollow axle and inner axle by which the axles are driven.

6. A magnetic drum separator comprising, a frame, a drum having a fixed end wall and a removable end wall, said removable end wall being inwardly dished in a direction toward the fixed end wall, a hollow shaft having one end secured at the center of the dished end wall, said shaft containing bearings, an inner shaft extending axially through the hollow shaft and rotative in said bearings, said inner shaft having an end projecting into the interior of the drum and terminating short of the fixed end wall, a magnet carrier mounted on said end within the drum, the opposite end of the inner shaft projecting out of the hollow shaft, said last-mentioned end of the inner shaft carrying a gear, a bearing on the frame in which said last-mentioned end of the inner shaft is rotative, a bearing on the frame in which the hollow shaft is rotative, and a gear carried by said hollow shaft.

7. A magnetic drum separator having a hollow rotatable drum provided with end walls, a rotatable magnet carrier located within the drum, the drum and magnet carrier being rotatable independently of one another, the drum and magnet carrier being each individually journalled on its own axle, the axle for the drum being mounted in bearings, said axle having an end portion projecting beyond the bearings and the drum being attached to said projecting end portion.

8. A magnet drum separator comprising, a frame, a hollow rotative drum having spaced end walls, a hollow axle located externally of the drum and attached at one end only to one of the end walls, a magnet carrier rotative within the drum, an inner axle located within the hollow axle and entering into the drum and terminating at a distance from the other end wall thereof, the magnet carrier being mounted on said inner axle, bearings supported by the frame and within which the hollow axle is rotative, said bearings being positioned adjacent to opposite ends of the hollow axle, bearings within the hollow axle in which the inner axle is rotative, and gears carried by the hollow axle and the inner axle by which said axles are respectively rotated.

References Cited in the file of this patent
UNITED STATES PATENTS

| 1,024,009 | Kronenberger | Apr. 23, 1912 |
| 1,527,069 | Peck | Feb. 17, 1925 |

FOREIGN PATENTS

| 520,725 | Canada | Jan. 17, 1956 |